US006706113B1

(12) United States Patent
Couturier

(10) Patent No.: US 6,706,113 B1
(45) Date of Patent: Mar. 16, 2004

(54) METHOD FOR PRODUCING AN ANHYDRITE III OR α BASED HYDRAULIC BONDING AGENT

(75) Inventor: Jean Couturier, Le Cannet (FR)

(73) Assignee: Societe Europeenne d'Exploitation de Technologies Industrielles, Le Cannet (FR)

( * ) Notice: Subject to any disclaimer, the term of this patent is extended or adjusted under 35 U.S.C. 154(b) by 0 days.

(21) Appl. No.: 09/913,206
(22) PCT Filed: Feb. 12, 1999
(86) PCT No.: PCT/FR99/00312
§ 371 (c)(1),
(2), (4) Date: Aug. 10, 2001
(87) PCT Pub. No.: WO00/47531
PCT Pub. Date: Aug. 17, 2000

(51) Int. Cl.$^7$ .............................................. C04B 11/00
(52) U.S. Cl. ...................... 106/772; 106/775; 423/171; 423/555
(58) Field of Search ................. 423/171, 172, 423/555; 106/772, 775

(56) References Cited

U.S. PATENT DOCUMENTS 4,647,486 A  3/1987  Ali ................................ 428/70
5,169,617 A  12/1992 Clemens ...................... 423/555
6,174,362 B1 * 1/2001 Dussel ......................... 106/772

FOREIGN PATENT DOCUMENTS

WO    90/08111    7/1990

OTHER PUBLICATIONS

Gerhartz W. et al., "The CASO4–H20 System" Ullmann's Encyclopedia of Industrial Chemistry, Benzyl Alcohol to Calcium Sultate, vol. A4, pp. 556–569.

* cited by examiner

Primary Examiner—Paul Marcantoni
(74) Attorney, Agent, or Firm—Cohen, Pontani, Lieberman & Pavane

(57) ABSTRACT

A process for synthesizing a hydraulic binder based on natural calcium sulfate (gypsum), the process consisting in heating the calcium sulfate to obtain a large proportion of anhydrite III or α anhydrite, and then in quenching. The process consists in: completely dehydrating the calcium sulfate, and suddenly cooling the matter thus dehydrated. The present invention finds a preferred application in the construction industry in obtaining a hydraulic binder that can be used as cement.

9 Claims, 4 Drawing Sheets

Dehydration curve

Dehydration curve

Two-dimensional unifrom Doehlert matrix

Tiling space uniformly

Uniform three-dimensional Doehlert matrix

Superposition of X-ray spectra

METHOD FOR PRODUCING AN ANHYDRITE III OR α BASED HYDRAULIC BONDING AGENT

PRIORITY CLAIM

This is a U.S. national stage application of international application No. PCT/FR99/00312, filed on Feb. 12, 1999. Priority is claimed from that application.

The invention relates to a process for treating a powdered starting material based on natural calcium sulfate (gypsum) or synthesized calcium sulfate (sulfogypsum, phosfogypsum and other by-products of the same type) with a view to preparing a novel hydraulic binder that can be used as a cement, based on very high proportions of anhydrite III or α anhydrite (α in the ASTM classification).

The invention also relates to the product from said process, that can be used as a cement.

Gypsum has a variety of crystalline forms; on a molecular scale, it has a lamallar structure in which a layer of water alternates with two layers of $CaSO_4$.

Gypsum has been used for thousands of years to produce plaster, one of the oldest construction materials, known since the $6^{th}$ century BC.

Nowadays, other industries use gypsum, in particular:
for cement production (as a setting regulator);
for agricultural use;
in a variety of industries (chemicals, paper, etc.).

By far the most important use is its involvement in cement and plaster production, by dehydrating gypsum.

While in the cement industry, gypsum is incorporated into clinkering and is burned at a high temperature of the order of 1400° C., when making plaster, the essential principle is to eliminate the water completely or partially from the gypsum—a complex operation that involves crystallization phenomena that are difficult to control.

Several types of calcium sulfate treatment processes have been proposed for preparing plaster. In particular, improved plaster (sometimes designated a plaster) can be prepared that, once hardened, has mechanical characteristics that are far superior to those of normal plaster. The phenomena that occur during such treatments are little understood and in general, the improvement in mechanical performance is attributed to the presence of anhydrite III or α anhydride in the products obtained, without accurately knowing the proportion of that type in the products, nor the conditions which can produce it in a stable and reproducible manner: it only exists in trace amounts.

Traditionally, improved plaster is produced from gypsum by burning under moist condition, in an autoclave, followed by a hot drying stage carried out in a stream of hot, dry air. Burning is carried out in a saturated steam atmosphere at a pressure of the order of 5 to 10 bars for a period of the order of 10 hours.

In order to try to overcome the drawbacks of that traditional process for producing improved plaster (a very expensive process with uncertain reproducibility), other processes have been proposed that attempt to reproduce the essential conditions of the traditional process (moist heat treatment followed by hot air drying) using different means and technologies (French patents FR-A-2 389 855, FR-A-2 445 940, FR-A-2 572 721, U.S. Pat. Nos. 2,269,580, 3,145,980).

The process of the invention was developed from the following observation: when calcium sulfate is treated normally to obtain an "improved plaster", the product obtained is in fact a mixture of anhydrous forms (γ anhydrite) or hydrated forms (semihydrates, dihydrates, . . . ). The inventor's studies have demonstrated that this state of affairs essentially derives from two factors. Firstly, burning produces α anhydrite and also other forms, and secondly, the product changes after burning, with partial transformation thereof, in particular re-hydration. The essential idea that has resulted in the process of the invention is to produce a stable final product containing a proportion by weight of α anhydrite that is much higher than that contained in known improved plaster; to this end, the structure of the compound obtained after burning is frozen by quenching. This considerably blocks the subsequent transformation of the α anhydrite formed by heat treatment.

PCT patent document PCT/FR96/00622 discloses that the quench operation is preferably carried out so that the material heated by burning is heated to a temperature of less than 100° C. over a period in the range 6 to 12 minutes. It can be achieved using cold dry compressed air injected at a plurality of locations into the moving material, the flow rate of the air being adjusted to obtain a suitable cooling rate.

However, that quench is not sufficiently effective to produce a proportion of anhydrite III or α anhydrite that is really significant. That prior art patent application cannot produce a very high percentage of anhydrite III or α anhydrite, namely 90%, and thus cannot produce a hydraulic binder that can be used as a cement.

The process of the invention can produce such a product.

The aim of the invention is to refine the process to obtain a high proportion of stable, soluble anhydrite III or α anhydrite.

The process of the invention can transform more than 90% of pure calcium sulfate into anhydrite III or α anhydrite.

To this end, the present invention provides a process for synthesizing a hydraulic binder based on natural calcium sulfate (gypsum) or synthetic calcium sulfate (sulphogypsum, phosphogypsum, titanogypsum, etc), consisting in heating the calcium sulfate to form:

a hydraulic binder that can be used as a cement based on anhydrite III or α anhydrite, characterized in that it contains more than 70% of stable, soluble anhydrite III or α anhydrite and in that it consists in carrying out:
  a heating or quenching step that brings the temperature of the treated gypsum from ambient temperature to a temperature in the range 220° C. to 350° C. depending on the characteristics of the treated gypsum;
  a step for rapidly quenching the product obtained, reducing its temperature from 220° C.–350° C. to less than 80° C. in less than two minutes, with the aim of stabilizing the α anhydrite by crystallographic blocking and fixing.

In one implementation of the process, the heating temperature is 300° C.–310° C.

In a preferred implementation, the temperature of the quench is in the range 40° C. to 50° C.

In a preferred implementation, the temperature is raised over a period of 10 to 40 minutes depending on the nature and grain size of the gypsum.

Prior to treatment, the treated gypsum comprises 0 to 20% of water, and its grain size is in the range 0 to 30 millimeters (mm).

In a preferred implementation, the treated gypsum comprises 5% to 15% of water and its grain size is in the range 0 to 10 mm.

A hydraulic binder that can be used as a cement based on anhydrite III or α anhydrite obtained by the above process is characterized in that it contains more than 70% of stable and soluble anhydrite III or α anhydrite.

A hydraulic binder that can be used as a cement based on anhydrite III or α anhydrite obtained by the above process is characterized in that it contains more than 90% of stable or soluble anhydrite III or α anhydrite.

A hydraulic binder that can be used as a cement based on anhydrite III or α anhydrite obtained by the above process is characterized in that the mechanical strength is:

22 MPa at 24 hours;
30 MPa at 8 days;
more than 40 MPa at 14 days.

The present invention also concerns a hydraulic binder that can be used as a cement obtained by carrying out the above process.

The essential inventive concept of the invention is thus to increase the proportion of α anhydrite in the product, the essential means employed being to limit the change in the product after burning by rapid cooling. To further increase this proportion of α anhydrite, the inventor also applied himself to optimizing the burning operation to obtain the largest possible quantity of this variety following burning.

When heated, gypsum produces a series of hydrated or anhydrous products.

At about 100° C., α or β semi-hydrates are obtained (depending respectively on whether steam pressure or free air is used) as defined in the reaction:

$$CaSO_4, 2 H_2O \text{ (monoclinic)} \longleftrightarrow CaSO_4, \tfrac{1}{2} H_2O + 3/2 H_2O \text{ (rhombohedral)}$$

At about 300° C., anhydrite III or a very soluble but highly unstable anhydrite is obtained which immediately re-hydrates to the semi-hydrate in contact with water vapor:

$$CaSO_4, \tfrac{1}{2} H_2O \text{ (rhombohedral)} \longleftrightarrow CaSO_4 \text{ III(or } \alpha) + \tfrac{1}{2} H_2O \text{ (hexagonal)}$$

At about 300° C. for the α semi-hydrate and 350° C. for the β, anhydrite III (or aα anhydrite) is transformed into stable anhydrite II (overburnt):

$$CaSO_4 \text{ III(or } \alpha) \text{ hexagonal} \longleftrightarrow CaSO_4 \text{ II orthohombic}$$

Anhydrite III slowly re-hydrates in contact with liquid water.

At about 1230° C., a new transformation reaction occurs:

$$CaSO_4 \text{ II orthohombic} \longleftrightarrow CaSO_4 \text{ I face centered cubic}$$

The anhydrite I $CaSO_4$ only re-hydrates with difficulty. Beyond 1250° C., the anhydrite I decomposes:

$$CaSO_4 \text{ I} \longleftrightarrow CaO + SO_2 + \tfrac{1}{2} O_2$$

Current industrial applications for plaster use only:
α semi-hydrate;
β semi-hydrate; and
anhydrite II (insoluble or overburnt).

The anhydrite II or α anhydrite of the present invention could not be used because of its high instability.

The variation in the properties of plaster in buildings and its numerous weaknesses as regards strength, water resistance, adhesion to certain supports, etc, is also known.

The present invention concerns a hydraulic binder obtained by a specific and novel gypsum heat treatment comprising two essential phases. The first, dehydration, phase, produces a high percentage of anhydrite III (or α anhydrite) $CaSO_4$. The second, rapid cooling, phase "blocks" the crystallography, rendering the anhydrite III (or α anhydrite) $CaSO_4$ stable and making it capable of use This rapid cooling, or quenching, in a dry atmosphere has never been carried out in the plaster industry.

Commercial plaster is obtained solely by dehydration and burning gypsum without any quenching, which latter constitutes the principal aspect of the invention.

The technical conditions for this novel hydraulic binder of the invention comprise:

1. A dehydration phase comprising raising the temperature of a low humidity gypsum (3% to 15% of water) to be treated; the temperature rise takes place over a period of 10 to 40 minutes, to a temperature of 220° C. to 350° C. depending on the nature of the gypsum, or more precisely between 300° C. and 310° C.

2. Rapid cooling or quenching in a dry atmosphere.

This rapid cooling, or quenching, has never been envisaged in the gypsum industry and stabilizes the highly soluble anhydrite III (or α anhydrite) $CaSO_4$ anhydrite, blocking its crystallization by the thermal shock which must reduce the temperature from 220–350° C. to less than 80° C. in less than two minutes.

The high percentage of stable and soluble anhydrite III (or α anhydrite) $CaSO_4$ (more than 70%, or even 90%) produces a remarkable hydraulic binder that can compete favorably with the majority of current binders.

This novel binder has the following characteristics:
fire resistance: inflammable, category Mo under French standard NF P 92-507;
excellent setting in seawater;
remarkable adhesion to all supports; and
setting at very low or high temperatures, etc.

The industrial applications for this binder are such that it is of interest to the cement, concrete and plaster industries, in rendering waste or industrial by-products inert, in the production of mixtures with materials that combine well with calcium sulfate, in building shelters in developing countries, etc.

This hydraulic binder can be produced by employing known techniques: low temperature burning (220° C. to 350° C.) and cooling. It can he carried out in very simple plant.

In addition to its technical qualities, this hydraulic binder is of:
economic importance;
energy saving importance;
ecological importance: non-polluting.

After complete dehydration, the percentage of anhydrite III (α anhydrite) $CaSO_4$ is over 50%, or even 70% to 80%, while the rapid cooling causes crystallization of the form III (or α anhydrite) $CaSO_4$ rendering it stable and soluble and enabling it to be used industrially.

The following implementation conditions appear to provide the best results. The amount of moisture in the starting material is first checked and then this amount is adjusted, if necessary, to a value substantially in the range 12% to 20%; burning is then carried out, bringing the powdered material to temperature by heating it under conditions sufficient to raise the temperature of the gas above the bed of material to a value in the range 350° C. to 500° C., and to bring the mean temperature of the material core to a value of over 220° C. and below 350° C. Heating can, for example, be carried out using infrared radiant heaters located above the bed of material, the power of said heaters being adjusted in correlation with the length of exposure of the material.

One possible explanation for the best results obtained with these operating conditions is as follows.

The temperature of 220–350° C. in the core of the bed of material is ideal for producing α anhydrite and no other forms. The extracted water escapes from the bed of material into an atmosphere that is hotter, wherein the temperature is higher than its critical point (365° C.). Thus, it rapidly reaches a supercritical state, preventing or limiting rehydration and the material surface changes such that when burning is finished, the proportion of α anhydrite is very high (it is not possible to give precise proportions as samples taken prior to cooling change immediately).

The exothermic transformation of α anhydrite to bassanite is very fast and is blocked by cooling that stabilizes the α anhydrite. Further, it appears that cooling completely blocks the change of the α anhydrite to bassanite plaster that is only found in trace amounts in the final product (in contrast to known binders that contain a large proportion of this form).

The product obtained when the binder of the invention sets (without filler) underwent flame resistance tests in accordance with French standard NTF P 92-507 (0.30 meter (m)/0.40 m samples subjected to radiation from a constant heat source) Determination of the four indices defined in the standard (flame index, development index, maximum flame length index, combustibility index) enabled the product to be placed in category MO, the highest of the six categories defined in the standard.

Further, strength tests carried out in accordance with the standard produced the following results:

compressive strength: 40 MPa; and bending strength: 10 MPa.

In addition, qualitative tests carried out on immersed samples showed that the strength of the product remained good in such a situation.

The study below, describing calcium sulfate dehydration, enabled the process of the invention to be perfected to obtain a true hydraulic binder that can be used as a cement.

The accompanying drawings are given by way of indication and are not limiting in nature. They represent a preferred implementation of the invention and enable the invention to be readily understood.

A—DEHYDRATION OF CALCIUM SULFATE

The study concerned the treatment of a powdered calcium sulfate based material for the production of a new hydraulic binder with interesting characteristics as regards set rate, and certain physical properties (thermal conductivity, mechanical strength, acoustic insulation, etc.).

Figure 1:
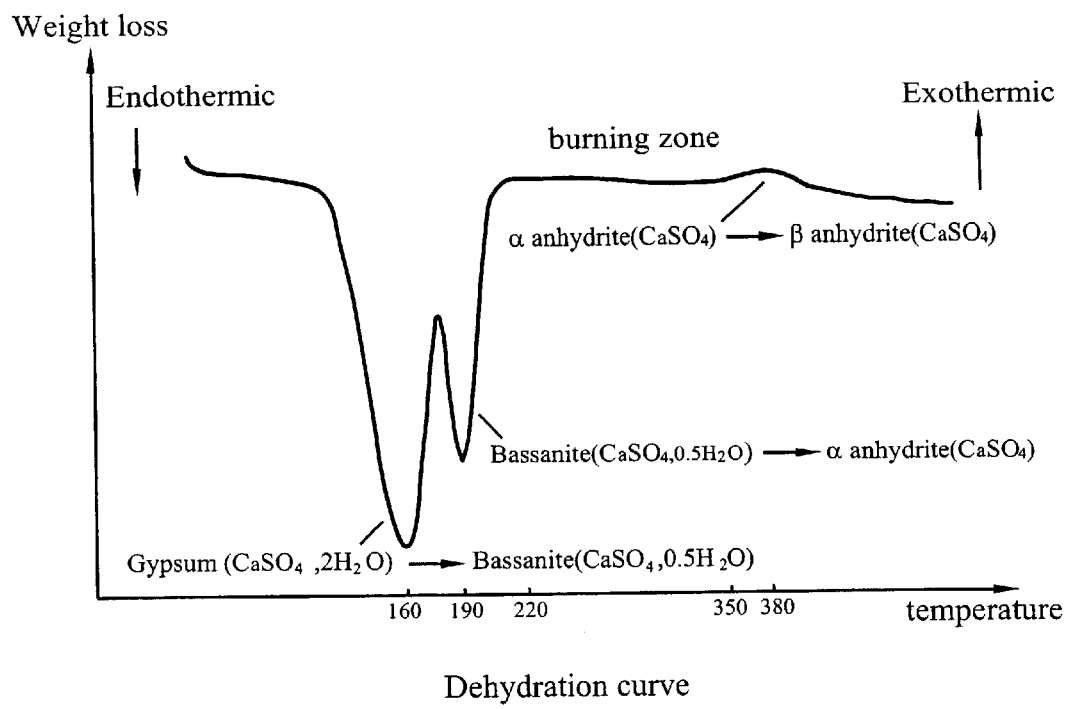
FIG. 1 is a thermal dehydration curve for gypsum.
Figure 2:
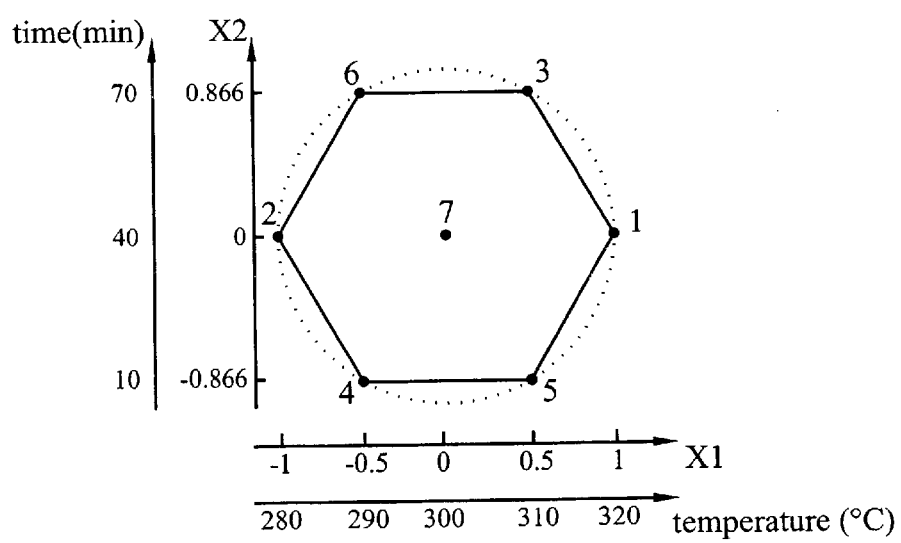
FIG. 2 shows a two-dimensional Dochlert matrix.

This process consists of combining two types of treatment in succession:

heating the powdered material to a temperature in the range 220° C. to 350° C. to form the α anhydrite (or anhydrite III) (see FIG. 1);

quenching the heated material to stabilize this metastable phase. Thus, its evolution into other crystallographic varieties is blocked and rehydration to bassanite, the major phase of plaster, is avoided.

B—EXPERIMENTAL METHODOLOGY

A number of experiments were carried out in an empirical manner on natural gypsum and on phoshogypsum, titanogypsum, borogypsum and desulphogypsum.

However, the inventor employed experimental design techniques to determine the influence of factors that could be involved in the formation of the α anhydrite phase and to limit the number of manipulations.

We therefore varied the temperature from 28° C. to 320° C. the duration of the constant temperature stage from 10 minutes to, 70 minutes and we used 3 sets of grain size ranges:<80;80–100; 100–200 μm.

The methodology for the experimental strategy, based on a mathematical and statistical approach, used a model for the phenomenon starting from a polynomial written in non-dimensional coded variables. A natural variable $U_1$ corresponded to each of these variables $X_1$ in accordance with the equation:

$$U_i^a = U_i^o + X_i^a \times \Delta U_i$$

where i=the factor;

$U_i^a$=the value of natural variable i for experiment a;

$U_i^o$=the value of the natural variable i at the center of the experimental range;

$$U_i^0 = \frac{U_i^{(+1)} + U_i^{(-1)}}{2}$$

$X_i^a$=the value of the coded variable i for experiment a;

$\Delta U_i$=the amount of variation of the natural variable i:

$$\Delta U_i^0 = \frac{U_i^{(+1)} + U_i^{(-1)}}{2}$$

When producing this novel hydraulic binder, the strategy was to use a uniform Doehlert matrix, a strategy that enables the coefficients of a polynomial model to be estimated (by the mean square rule).

In a [(−1) (+1)] coded space for the variables studied, the general equation is given below:

$$y = b_0 + \sum_{i=1}^{k} b_i X_i + \sum_{i=1}^{k} b_{ii} X_i^2 + \sum_{\substack{i<j \\ j=2}}^{k} b_{ij} X_i X_j$$

where y=measured response (output parameter)

Figure 3:
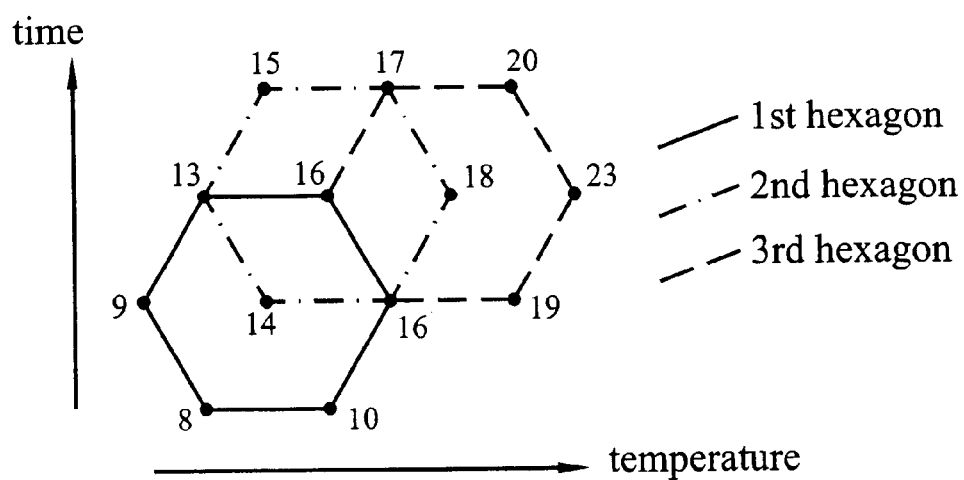
FIG. 3 shows a uniform tiling of space.

$b_O$=mean value of response $b_i$=principal effect of variable i;

$b_{ii}$=squared effect of variable i;

$b_{ij}$=effect of interaction between variables i and j;

In the two-variable case shown in FIG. 3, the seven experiments carried out are distributed in a centered regular hexagon inscribed in a circle with radius 1.

The two-variables are the temperature (280° C. to 320° C.) and time (10 to 70 minutes). The experimental matrix (in coded variables) and the experimental strategy) (in natural variable) are shown in Table 1

TABLE 1

Experimental matrix and experimental strategy for a uniform two-dimensional Doehlert matrix

| | Coded variables ($X_i$) | | Natural variables ($U_i$) | |
|---|---|---|---|---|
| | | | Temperature | Time |
| No | X1 | X2 | (° C.) | (min) |
| 1 | 1 | 0 | 320 | 40 |
| 2 | −1 | 0 | 280 | 40 |
| 3 | 0.5 | 0.866 | 310 | 70 |
| 4 | −0.5 | −0.866 | 290 | 10 |
| 5 | 0.5 | −0.866 | 310 | 10 |
| 6 | −0.5 | 0.866 | 290 | 70 |
| 7 | 0 | 0 | 300 | 40 |

This model, therefore, is characterized by five temperature values and 3 temperature levels.

$$U_i^0 = \frac{320 + 280}{2} = 300° C. \text{ where } U_i^{(-1)} = 280° C. \ U_i^{(+1)} = 320° C.$$

$$\Delta U_i = \frac{320 + 280}{2} = 20° C. \text{ and } X_i = 0.5$$

Figure 4:
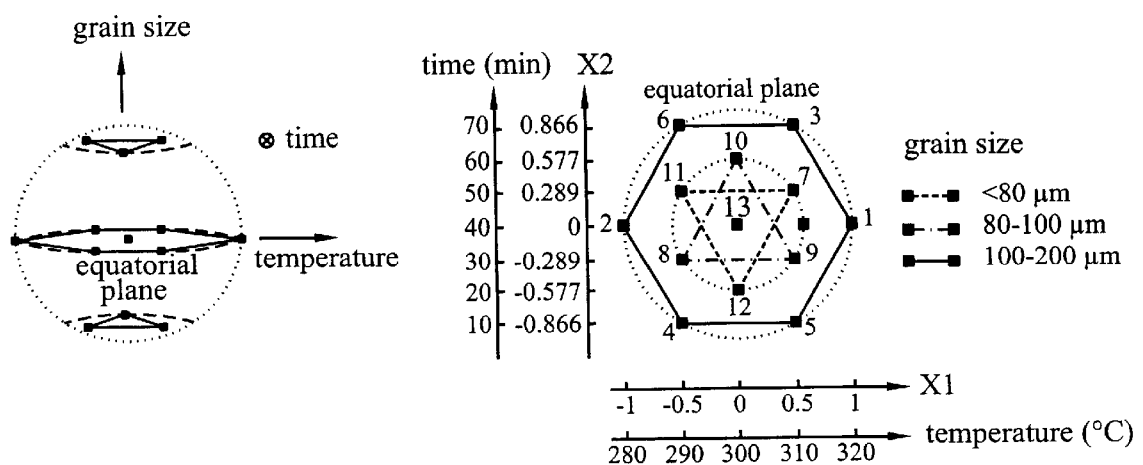
FIG. 4 shows a uniform three-dimensional Dochlert matrix.

This strategy has two advantages:

If, after carrying out the seven experiments of the first centered hexagon shown in FIG. 4, only four results (percentage of α anhydrite, represented in solid lines in FIG. 4) are of interest, only three manipulations are necessary to construct the second regular centered hexagon. A similar approach would enable a third hexagon to be constructed. Thus, space can be tiled in uniform manner and the optimal conditions for producing α anhydrite are defined.

Further, to study the influence of a third factor (for example, grain size), only six additional experiments will be necessary (three with grain sizes higher than that used to carry out the first seven experiments and three with lower grain sizes, in a symmetrical manner). The three-dimensional uniform Doehlert matrix is shown with a sphere centered with the hexagon in the equatorial plane. It is characterized by five temperature values, seven time levels and three grain size ranges (see FIG. 5).

Experimental design thus allows the number of manipulations to be considerably reduced. The experimental matrix, experimental strategy and the results in Table 2.

C—RESULTS

Figure 5:
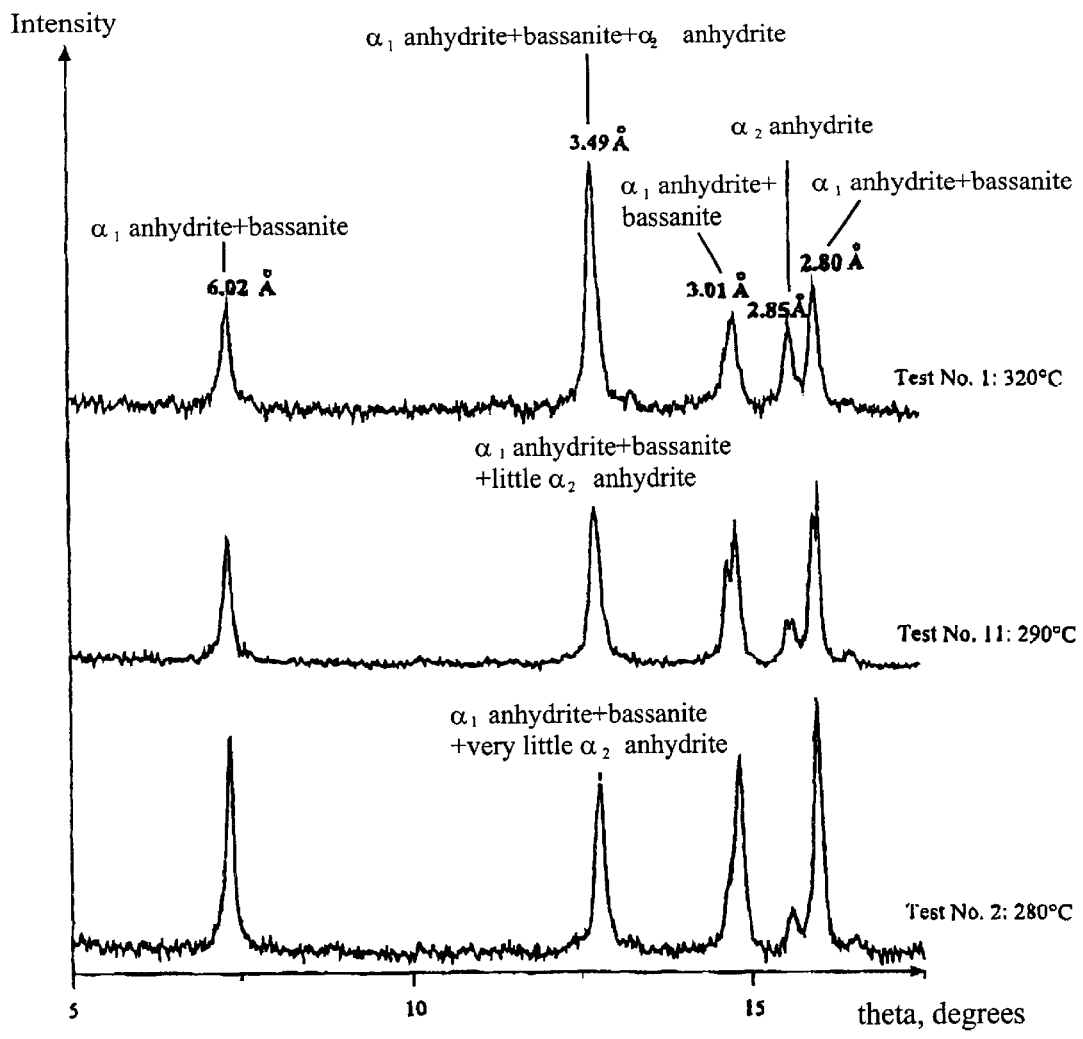
FIG. 5 is a view showing the superimposition of X-ray spectra.

The inventor carried out thirteen manipulations starting from a natural gypsum as determined by the experimental strategy shown in FIG. 5.

Thermogravimetric analysis (TGA) and differential scanning calorimetry (DSC) enables the percentage of α anhydrite to be determined. X ray diffractometry was used to ascertain the phases present and to distinguish two varieties of α $CaSO_4$ which we shall designate $\alpha_1$ $\alpha_2$ (see FIG. 5.)

The results are shown in the following table:

TABLE 2

Experimental matrix, experimental strategy and results of analysis of treated products starting from natural gypsum.

| | Experimental matrix | | | Experimental strategy | | | Response | | |
|---|---|---|---|---|---|---|---|---|---|
| | | | | T° | Time | Grain size | % α | t° endo | Qy $\alpha_2$ |
| No | X1 | X2 | X3 | (° C.) | (min) | (μm) | anh | rx* | anh⊗ |
| 1 | 1 | 0 | 0 | 320 | 40 | 80–100 | 86.1 | 127.5 | ● |
| 2 | −1 | 0 | 0 | 280 | 40 | 80–100 | 89.7 | 120.7 | ○ |
| 3 | 0.5 | 0.866 | 0 | 310 | 70 | 80–100 | 90.3 | 119.8 | ● |
| 4 | −0.5 | −0.866 | 0 | 290 | 10 | 80–100 | 87.3 | 118.6 | ○ |
| 5 | 0.5 | −0.866 | 0 | 310 | 10 | 80–100 | 84.2 | 130.5 | ● |
| 6 | −0.5 | 0.866 | 0 | 290 | 70 | 80–100 | 86.8 | 120.2 | · |
| 7 | 0.5 | 0.829 | 0.816 | 310 | 50 | 100–200 | 89.4 | 122.0 | ● |
| 8 | −0.5 | −0.829 | −0.816 | 290 | 30 | <80 | 74.7 | 135.5 | ○ |
| 9 | 0.5 | −0.829 | −0.816 | 310 | 30 | <80 | 89.9 | 118.2 | ● |
| 10 | 0 | 0.577 | −0.816 | 300 | 60 | <80 | 83.3 | 130.8 | ● |
| 11 | −0.5 | 0.829 | 0.816 | 290 | 50 | 100–200 | 81.5 | 132.9 | · |
| 12 | 0 | −0.577 | 0.816 | 300 | 20 | 100–200 | 86.5 | 120.9 | ● |
| 13 | 0 | 0 | 0 | 300 | 40 | 80–100 | 90.9 | 110.1 | ● |

● large
· small
○ very small
— high/long heating temperature/time
— low/short heating temperature/time
* endothermic bassanite → α anhydrite reaction
* ⊗proportion of $\alpha_2$ anhydrite in a mixture of bassanite and $\alpha_1$ anhydrite.

Manipulations 13, 3 and 9 show that the best percentages of α anhydrite (≠90%) were obtained for a burning temperature of 300° C. to 310° C. We also noticed that these good results corresponded to the minimum endothermnic reaction temperatures for the bassanite (110° C. in the case of experiment 13).

FIG. 6 qualitatively and semi-quantitatively shows the phases present if the treated products. If the treated product is a mixture of $\alpha_1$ anhydrite and bassanite, the 2,80 Angstrom (Å) line has 100% intensity.

In contrast, the large amount of $\alpha_2$ anhydrite in the product causes an increase in the 3.49 Å line which then reaches 100% intensity, and the increasingly substantial appearance of the 2.85 Å line of the $\alpha_2$ anhydrite. At the same time, the relative intensity of the lines at 6.02 Å 3.01 Å and 2.80 Å reduces. Superimposing the X ray diffraction spectra reveals an increase in the proportion of $\alpha_2$ anhydrite with temperature in a mixture of $\alpha_1$ anhydrite and bassanite.

The invention described can produce a product that is a true hydraulic binder, containing more than 70% of stable and soluble $\alpha$ anhydrite (or even 80% to 90%) with astonishing properties and uses:

rapid setting: in three minutes;

setting accelerator;

high strength (35 MPa at 7 days), a thermal and acoustic insulator;

treatment of industrial residues: inerting or strengthening;

coatings for facades;

screeds for buildings;

prefabrication of dwellings, etc.

In addition to these technical qualities, this hydraulic binder is of:

economic importance;

energy-saving importance;

ecological importance: no pollution.

The process of the invention can transform more than 90% of pure calcium sulfate into anhydrite III or $\alpha$ anhydrite.

All types of gypsum contain pure calcium sulfate plus impurities.

Depending on the purity of the calcium sulfate, different types of cement are obtained.

Regardless of the finished product, the novel binder comprises less than 10% of "plaster".

What is claimed is:

1. A process for synthesizing a hydraulic binder from natural calcium sulfate or synthesized calcium sulfate, consisting in treating said calcium sulfate to form:

a hydraulic binder comprising anhydrite III or $\alpha$ anhydrite comprising:

a heating the calcium sulfate from ambient temperature to a temperature in the range 220° C. to 350° C. depending on the characteristics of the calcium sulfate in the treating step;

rapidly quenching the product obtained by reducing its temperature from 220° C.–350° C. to less than 80° C. in less than two minutes, for stabilizing the $\alpha$ anhydrite by crystallographic blocking and fixing; and obtaining an hydraulic binder that contains more than 70% of stable, soluble anhydrite III or $\alpha$ anhydrite.

2. A process according to claim 1, characterized in that the heating temperature is in the range of 300° C.–310° C.

3. A process according to claim 1, characterized in that the quenching temperature is in the range 40° C. to 50° C.

4. A process according to claim 1, characterized in that the temperature is raised in a period of 10 to 40 minutes depending on the nature and grain size of the calcium sulfate.

5. A process according to claim 4, characterized in that prior to treatment, the treated calcium sulfate comprises 0 to 20% of water, and its grain size is in the range 0 to 30 millimeters (mm).

6. A process according to claim 5, characterized in that the treated calcium sulfate comprises 5% to 15% of water and its grain size is in the range 0 to 10 mm.

7. A hydraulic binder that can be used as a cement comprising anhydrite III or $\alpha$ anhydrite obtained by the process according to any one of claims 1 to 6.

8. A hydraulic binder that can be used as a cement comprising anhydrite III or $\alpha$ anhydrite obtained by the process according to any one of claims 1 to 6, characterized in that it contains more than 90% of stable or soluble anhydrite III or $\alpha$ anhydrite.

9. A hydraulic binder that can be used as a cement comprising anhydrite III or $\alpha$ anhydrite obtained by the process according to any one of claims 1 to 6, characterized in that the mechanical strength is: 22 Mpa at 24 hours; 30 Mpa at 8 days; more than 40 Mpa at 14 days.

* * * * *